US010287417B2

(12) United States Patent
Pfeiffer et al.

(10) Patent No.: US 10,287,417 B2
(45) Date of Patent: May 14, 2019

(54) PLASTICIZER COMPOSITION CONTAINING POLYMERIC DICARBOXYLIC ACID ESTERS AND TEREPHTHALIC ACID DIALKYL ESTERS

(71) Applicant: BASF SE, Ludwigshafen (DE)

(72) Inventors: Matthias Pfeiffer, Böhl-Iggelheim (DE); Boris Breitscheidel, Waldsee (DE); Axel Grimm, Edenkoben (DE); Herbert Morgenstern, Ellerstadt (DE)

(73) Assignee: BASF SE (DE)

( * ) Notice: Subject to any disclaimer, the term of this patent is extended or adjusted under 35 U.S.C. 154(b) by 0 days.

(21) Appl. No.: 15/547,266

(22) PCT Filed: Jan. 29, 2016

(86) PCT No.: PCT/EP2016/051864
§ 371 (c)(1),
(2) Date: Jul. 28, 2017

(87) PCT Pub. No.: WO2016/120417
PCT Pub. Date: Aug. 4, 2016

(65) Prior Publication Data
US 2018/0022891 A1    Jan. 25, 2018

(30) Foreign Application Priority Data
Jan. 30, 2015  (EP) .................................... 15153267

(51) Int. Cl.
*C08K 5/12*    (2006.01)
*C08K 5/11*    (2006.01)

(52) U.S. Cl.
CPC . *C08K 5/12* (2013.01); *C08K 5/11* (2013.01)

(58) Field of Classification Search
CPC .............. C08K 5/11; C08K 5/12; C08L 27/06
USPC ........................................................ 524/297
See application file for complete search history.

(56) References Cited

U.S. PATENT DOCUMENTS

| | | | |
|---|---|---|---|
| 2,921,089 A | 1/1960 | Hagemeyer, Jr. et al. |
| 3,418,351 A | 12/1968 | Greene et al. |
| 3,929,898 A | 12/1975 | Nienburg et al. |
| 3,932,523 A | 1/1976 | Strohmeyer et al. |
| 4,009,124 A | 2/1977 | Laurer et al. |

(Continued)

FOREIGN PATENT DOCUMENTS

| | | |
|---|---|---|
| DE | 1593368 A1 | 7/1970 |
| DE | 1945359 A1 | 3/1971 |

(Continued)

OTHER PUBLICATIONS

International Preliminary Examination Report for PCT/EP2016/051864 dated Feb. 6, 2017.

(Continued)

*Primary Examiner* — William K Cheung
(74) *Attorney, Agent, or Firm* — Drinker Biddle & Reath LLP

(57) ABSTRACT

The present invention relates to a plasticizer composition which comprises at least one polymeric dicarboxylic ester and at least one dialkyl terephthalate, to molding compositions which comprise a thermoplastic polymer or an elastomer and such a plasticizer composition, and the use of these plasticizer compositions and molding compositions.

27 Claims, 1 Drawing Sheet

(56) References Cited

U.S. PATENT DOCUMENTS

| | | | |
|---|---|---|---|
| 4,148,830 | A | 4/1979 | Pruett et al. |
| 4,426,524 | A | 1/1984 | Plummer |
| 5,281,647 | A | 1/1994 | Eapen |
| 5,288,918 | A | 2/1994 | Maher et al. |
| 5,324,853 | A | 6/1994 | Jones et al. |
| 5,434,313 | A | 7/1995 | Harrison et al. |
| 5,696,297 | A | 12/1997 | Kneuper et al. |
| 5,849,972 | A | 12/1998 | Vicari et al. |
| 6,225,507 | B1 | 5/2001 | Giessler et al. |
| 6,284,917 | B1 | 9/2001 | Brunner et al. |
| 6,310,235 | B1 | 10/2001 | Gick |
| 6,310,261 | B1 | 10/2001 | Geissler et al. |
| 6,437,170 | B1 | 8/2002 | Thil et al. |
| 6,624,285 | B2 | 9/2003 | Holzmann et al. |
| 6,723,884 | B1 | 4/2004 | Grenacher et al. |
| 6,765,119 | B2 | 7/2004 | Hoffmann et al. |
| 7,173,138 | B2 | 2/2007 | Ahlers et al. |
| 7,208,545 | B1 | 4/2007 | Brunner et al. |
| 7,385,075 | B2 | 6/2008 | Disteldorf et al. |
| 8,329,796 | B2 | 12/2012 | Grass |
| 9,309,183 | B2 | 4/2016 | Storzum et al. |
| 9,670,128 | B2 | 6/2017 | Storzum et al. |
| 2003/0077439 | A1 | 4/2003 | Neubert et al. |
| 2006/0025544 | A1* | 2/2006 | Koube .................. C08G 63/16 525/437 |
| 2011/0200808 | A1 | 8/2011 | Müssig et al. |
| 2016/0264509 | A1 | 9/2016 | Kaller et al. |
| 2017/0044352 | A1 | 2/2017 | Storzum et al. |
| 2017/0145187 | A1 | 5/2017 | Pfeiffer et al. |
| 2017/0313848 | A1 | 11/2017 | Pfeiffer et al. |

FOREIGN PATENT DOCUMENTS

| | | | |
|---|---|---|---|
| DE | 2139630 | A1 | 2/1973 |
| DE | 2244373 | A1 | 4/1974 |
| DE | 2404855 | A1 | 8/1975 |
| DE | 2445303 | A1 | 4/1976 |
| DE | 2612355 | A1 | 10/1977 |
| DE | 2628987 | A1 | 1/1978 |
| DE | 3228881 | A1 | 2/1984 |
| DE | 4339713 | A1 | 5/1995 |
| EP | 366089 | A2 | 5/1990 |
| EP | 695734 | A1 | 2/1996 |
| EP | 0915485 | A1 | 5/1999 |
| EP | 880494 | B1 | 5/2000 |
| EP | 1113034 | A1 | 7/2001 |
| EP | 1047655 | B1 | 5/2003 |
| GB | 1579159 | A | 11/1980 |
| JP | 10025385 | A2 † | 1/1998 |
| RO | 104737 | B1 | 9/1994 |
| WO | WO-9514647 | A1 | 6/1995 |
| WO | WO-9823566 | A1 | 6/1998 |
| WO | WO-9932427 | A1 | 7/1999 |
| WO | WO-0063151 | A1 | 10/2000 |
| WO | WO-0078704 | A1 | 12/2000 |
| WO | WO-01014297 | A1 | 3/2001 |
| WO | WO-0187809 | A1 | 11/2001 |
| WO | WO-02038531 | A1 | 5/2002 |
| WO | WO-0283695 | A1 | 10/2002 |
| WO | WO-03029339 | A1 | 4/2003 |
| WO | WO-05028407 | A1 | 3/2005 |
| WO | WO-2007021987 | A1 | 2/2007 |
| WO | WO-2009095126 | A1 | 8/2009 |
| WO | WO-2010070026 | | 6/2010 |

OTHER PUBLICATIONS

International Search Report for PCT/EP2016/051864 dated Apr. 4, 2016.

* cited by examiner
† cited by third party

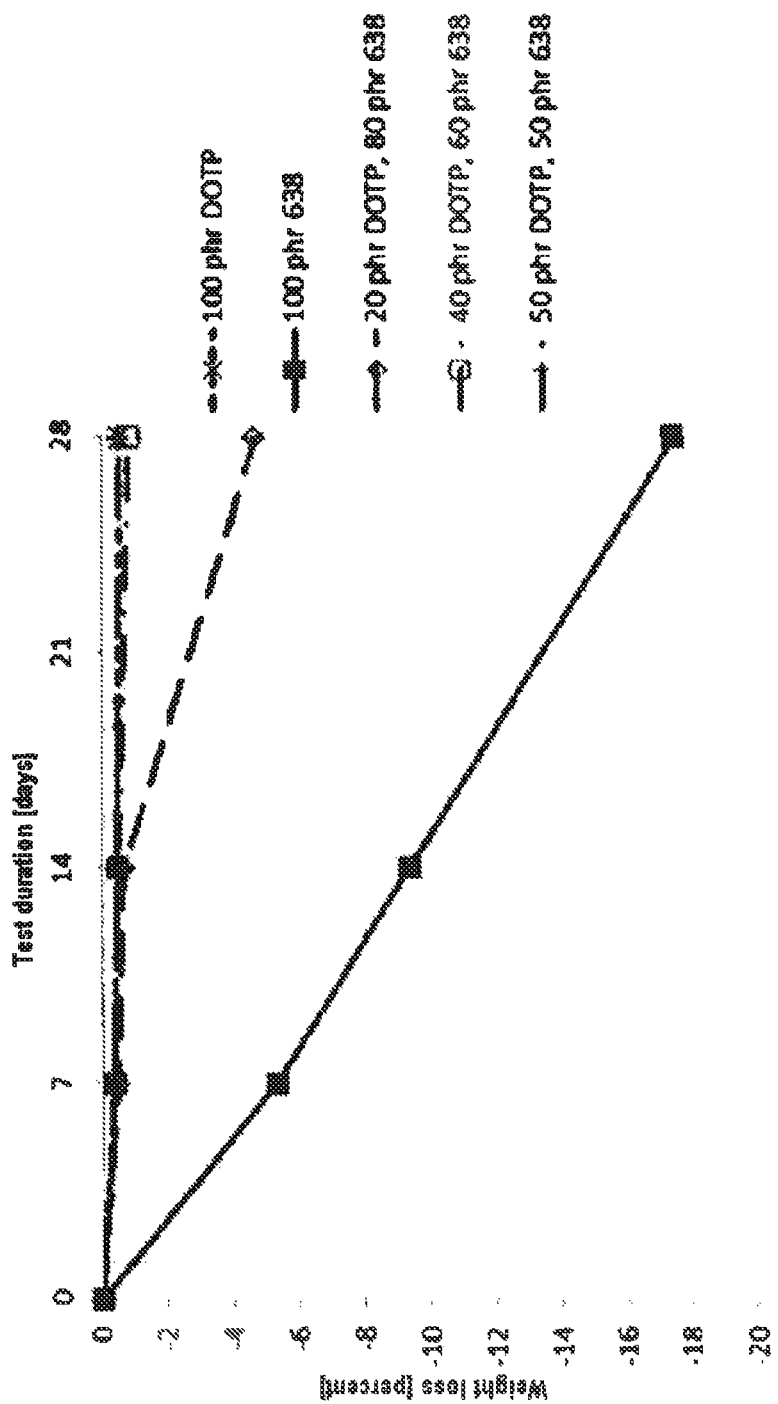

PLASTICIZER COMPOSITION CONTAINING POLYMERIC DICARBOXYLIC ACID ESTERS AND TEREPHTHALIC ACID DIALKYL ESTERS

CROSS-REFERENCE TO RELATED APPLICATIONS

This application is a national stage application (under 35 U.S.C. § 371) of PCT/EP2016/051864, filed Jan. 29, 2016, which claims benefit of European Application No. 15153267.8, filed Jan. 30, 2015, both of which are incorporated herein by reference in their entirety.

BACKGROUND OF THE INVENTION

The present invention relates to a plasticizer composition which comprises at least one polymeric dicarboxylic ester and at least one dialkyl terephthalate, to molding compositions which comprise a thermoplastic polymer or an elastomer and this plasticizer composition, and to the use of these plasticizer compositions and molding compositions.

PRIOR ART

Desired processing properties or desired performance properties are achieved in many plastics by adding what are known as plasticizers, in order to render the plastics softer, more flexible and/or more extensible. In general, the use of plasticizers serves to shift the thermoplastic range of plastics toward lower temperatures, so that the desired elastic properties are obtained in the region of low processing temperatures and service temperatures.

Production quantities of polyvinyl chloride (PVC) are among the highest of any plastic. Because of the versatility of this material, it is nowadays found in a wide variety of products used in everyday life. PVC therefore has very great economic importance. Intrinsically, PVC is a plastic which is hard and brittle at up to about 80° C., and is used in the form of rigid PVC (PVC-U) by addition of heat stabilizers and other adjuvants. Flexible PVC (PVC-P) is obtained only by adding suitable plasticizers, and can be used for many applications for which rigid PVC is unsuitable.

Examples of other important thermoplastic polymers in which plasticizers are usually used are polyvinyl butyral (PVB), homopolymers and copolymers of styrene, polyacrylates, polysulfides, or thermoplastic polyurethanes (PU).

The suitability of a substance for use as a plasticizer for a particular polymer depends largely on the properties of the polymer that is to be plasticized. The desire is generally for plasticizers which enjoy high compatibility with the polymer to be plasticized, which endow it with good thermoplastic properties, and which possess only low propensity to evaporation and/or exudation (high permanence).

A host of different compounds are available on the market for the plasticizing of PVC and other plastics. On account of their high compatibility with PVC and because of their advantageous performance properties, phthalic diesters with alcohols of various chemical structures have been much used in the past as plasticizers, examples being diethylhexyl phthalate (DEHP), diisononyl phthalate (DINP), and diisodecyl phthalate (DIDP).

There is a need to replace at least some of the aforementioned phthalate plasticizers, given that they are suspected of being injurious to health. This is especially so for sensible areas of application, such as children's toys, food packaging, or medical articles.

Known in the prior art are a variety of alternative plasticizers with different properties for a diversity of plastics, and especially for PVC.

One class of plasticizer known from the prior art, and able to be used as an alternative to phthalates, is based on cyclohexanepolycarboxylic acids, as described in WO 99/32427. In contrast to their unhydrogenated aromatic analogs, these compounds are toxicologically unobjectionable and can be used even in sensitive areas of application. The corresponding lower alkyl esters generally possess fast-gelling properties.

WO 00/78704 describes selected dialkyl cyclohexane-1,3- and -1,4-dicarboxylic esters for use as plasticizers in synthetic materials.

Another known measure for setting the desired plasticizer properties is to use mixtures of plasticizers—for example, at least one plasticizer which imparts good thermoplastic properties but does not gel so well, in combination with at least one plasticizer which imparts good gelling properties.

WO 03/029339 discloses PVC compositions comprising cyclohexanepolycarboxylic esters, and also mixtures of cyclohexanepolycarboxylic esters with other plasticizers. Suitable other plasticizers stated are nonpolymeric ester plasticizers, such as terephthalic esters, phthalic esters, isophthalic esters, and adipic esters. Further disclosed are PVC compositions comprising mixtures of cyclohexanepolycarboxylic esters with various fast-gelling plasticizers. Suitable fast-gelling plasticizers mentioned are, in particular, various benzoates, aromatic sulfonic esters, citrates, and also phosphates. Polyester plasticizers are mentioned only as part of a very comprehensive list, without being particularized in any way at all in the patent specification.

Another class of plasticizer known from the prior art, and able to be used as alternatives to phthalates, is that of terephthalic esters, as described in WO 2009/095126, for example.

Besides monomeric plasticizers, various polyesters are likewise used as plasticizers. Polyester plasticizers are generally prepared by esterification of polyhydric alcohols, as for example 1,2-ethanediol, 1,2-propanediol, 1,3-propanediol, 1,3-butanediol, 1,4-butanediol, 1,5-pentanediol, or 1,6-hexanediol, with a polycarboxylic acid, such as succinic acid, glutaric acid, adipic acid, pimelic acid, suberic acid, sebacic acid, or azelaic acid. Optionally it is possible for terminal alcohol groups (in the case of syntheses with alcohol excess) to be capped with monocarboxylic acids, acetic acid for example, or for terminal acid groups (in the case of syntheses with acid excess) to be capped with monohydric alcohols, such as 2-ethylhexanol isononanol, 2-propylheptanol or isodecanol. Polyester plasticizers are used primarily in the production of foils, coatings, profiles, floor coverings, and cables based on flexible PVC, when heightened requirements are imposed on the resistance to extraction, relative to mineral spirit, oils, and fats, among others, and on the UV resistance and on the volatility of the plasticizer.

U.S. Pat. No. 5,281,647 describes a method for producing polyester plasticizers where dicarboxylic acids, such as sebacic acid, glutaric acid, azelaic acid and/or adipic acid, are reacted with strongly sterically hindered dials and small amounts of linear dials to form polyesters, after which the acidic end groups of the polyesters are esterified with a further alcohol, and also describes the use thereof for plasticizing rubber and PVC. Specifically described is the preparation of a polyester plasticizer on the basis of adipic acid, trimethylpentanediol, and propylene glycol, the terminal acid groups being esterified with 2-ethylhexanol. These polyesters are said to be suitable as plasticizers for PVC and rubber and to be distinguished by high extraction resistance in relation to oils and soapy water.

RO 104 737 describes polyester plasticizers based on adipic acid and propylene glycol, their terminal acid groups being esterified with 2-ethylhexanol. The polyesters are said to be suitable as plasticizers for PVC and to be notable in particular for high stability in storage.

EP 1 113 034 describes polyester plasticizers obtainable by reaction of aliphatic dicarboxylic acids, neopentyl alcohol, at least one further diol, and isomeric nonanols, a process for preparing them, and their use as plasticizers. The polyesters are said to be distinguished in particular by low migration propensity, especially with respect to acrylonitrile-butadiene-styrene copolymers, polystyrene, and polymethyl methacrylate.

A substantial disadvantage of the majority of plasticizers and plasticizer compositions described above which are a suitable alternative to phthalates from a toxicological viewpoint, however, is that they lack effective compatibility with plastics, especially with PVC; in other words, they exude to a considerable extent during use, and therefore result in a partial loss of the elastic properties of the plasticized plastics produced using these plasticizers. This is true in particular of the polyester plasticizers, whose use is vital for many applications where heightened requirements are imposed on the extraction resistance, relative to mineral spirit, oils, and fats, among other substances, and on the UV resistance and on the volatility of the plasticizer.

It is an object of the present invention to provide a toxicologically safe plasticizer composition, comprising at least one polyester plasticizer for thermoplastic polymers and elastomers, which has high compatibility with the polymer to be plasticized and which as a result shows little or no propensity toward exudation during service, thereby maintaining the elastic properties of the plasticized plastics produced using these plasticizers, even over prolonged periods of time.

This object is surprisingly achieved by a plasticizer composition comprising a) at least one compound of the general formula (I),

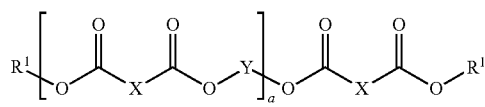

in which
X independently at each occurrence is an unbranched or branched $C_2$-$C_8$ alkylene group or an unbranched or branched $C_2$-$C_8$ alkenylene group, comprising at least one double bond,
Y is an unbranched or branched $C_2$-$C_{12}$ alkylene group or an unbranched or branched $C_2$-$C_{12}$ alkenylene group, comprising at least one double bond,
a is an integer from 1 to 100,
and
$R^1$ independently at each occurrence is selected from unbranched or branched $C_4$-$C_{12}$ alkyl radicals,
where the groups X present in the compounds (I) can have the same or different definitions and where, in the event that the compounds (I) comprise more than one group Y, these groups may have the same or different definitions,
and
b) at least one compound of the general formula (II),

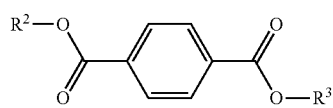

in which
$R^2$ and $R^3$ independently of one another are selected from branched and unbranched $C_4$-$C_{12}$ alkyl radicals.

A further subject of the invention are molding compositions which comprise at least one thermoplastic polymer or elastomer and a plasticizer composition as defined above and hereinafter.

A further subject of the invention is the use of a plasticizer composition as defined above and hereinafter as plasticizer for thermoplastic polymers, more particularly polyvinyl chloride (PVC), and elastomers.

A further subject of the invention is the use of these molding compositions for producing moldings and foils.

DESCRIPTION OF THE INVENTION

The plasticizer compositions of the invention have the following advantages:
The plasticizer compositions of the invention are notable for high compatibility with the polymers to be plasticized, more particularly PVC.
The plasticizer compositions of the invention show no tendency at all, or only a slight tendency, to exude during the service of the end products. As a result, the elastic properties of the plasticized plastics produced using these plasticizer compositions are obtained, even over prolonged periods of time.
The plasticizer compositions of the invention are suitable advantageously for the attainment of a multiplicity of very different and complex processing properties and performance properties of plastics.
The plasticizer composition of the invention are suitable for use for the production of moldings and films for sensitive areas of application, such as medical products, food packaging, products for the interior sector, of dwellings and vehicles, for example, toys, childcare articles, etc.
The compounds (I) present in the plasticizer compositions of the invention can be produced using readily available starting materials. A particular environmental and economic advantage lies in the possibility of being able to utilize not only petrochemical raw materials available in large quantities but also renewable raw materials for producing the compounds (I) employed in accordance with the invention.
The processes for the preparation of the compounds (I) used in accordance with the invention are simple and efficient, allowing them to be provided readily on an industrial scale.

For the purposes of the present invention, the expression "$C_2$-$C_{12}$ alkylene" refers to divalent hydrocarbon radicals having 2 to 12 carbon atoms. The divalent hydrocarbon radicals may be unbranched or branched. They include, for example, 1,2-ethylene, 1,2-propylene, 1,3-propylene, 1,3-butylene, 1,4-butylene, 2-methyl-1,3-propylene, 1,1-dimethyl-1,2-ethylene, 1,4-pentylene, 1,5-pentylene, 2-methyl-1,4-butylene, 2,2-dimethyl-1,3-propylene, 1,6-hexylene, 2-methyl-1,5-pentylene, 3-methyl-1,5-pentylene, 2,3-dimethyl-1,4-butylene, 1,7-heptylene, 2-methyl-1,6-hexylene, 3-methyl-1,6-hexylene, 2-ethyl-1,5-pentylene, 3-ethyl-1,5-pentylene, 2,3-dimethyl-1,5-pentylene, 2,4-dimethyl-1,5-pentylene, 1,8-octylene, 2-methyl-1,7-heptylene, 3-methyl-1,7-heptylene, 4-methyl-1,7-heptylene, 2-ethyl-1,6-hexylene, 3-ethyl-1,6-hexylene, 2,3-dimethyl-1,6-hexylene, 2,4-dimethyl-1,6-hexylene, 1,9-nonylene, 2-methyl-1,8-octylene, 3-methyl-1,8-octylene, 4-methyl-1,8-octylene, 2-ethyl-1,7-heptylene, 3-ethyl-1,7-heptylene, 1,10-decylene, 2-methyl-1,9-nonylene, 3-methyl-1,9-nonylene, 4-methyl-1,9-nonylene, 5-methyl-1,9-nonylene, 1,11-undecylene, 2-methyl-1,10-decylene, 3-methyl-1,10-decylene, 5-methyl-1,10-decylene, 1,12-dodecylene, and the like. Preferably "$C_2$-$C_{12}$ alkylene" comprises branched or unbranched $C_2$-$C_8$ alkylene groups, more preferably branched or unbranched $C_2$-$C_5$-alkylene groups, more particularly 1,3-propylene, 2,2-dimethyl-1,3-propylene and 1,4-butylene.

The expression "$C_2$-$C_{12}$ alkylene" also includes within its definition the expression "$C_2$-$C_8$ alkylene", "$C_2$-$C_6$ alkylene", and "$C_2$-$C_5$ alkenylene".

For the purposes of the present invention, the expression "$C_2$-$C_{12}$ alkenylene" relates to divalent hydrocarbon radicals having 2 to 12 carbon atoms, which may be unbranched or branched, with the main chain having at least one double bond. The "$C_2$-$C_{12}$ alkene" preferably comprises branched and unbranched $C_2$-$C_8$ alkenylene groups having one double bond. These include, for example, ethenylene, propenylene, 1-methylethenylene, 1-, 2-butenylene, 1-methylpropenylene, 2-methylpropenylene, 1-, 2-pentenylene, 1-methyl-1-butenylene, 1-methyl-2-butenylene, 1-, 2-, 3-hexenylene, 1-methyl-1-pentenylene, 1-methyl-2-pentenylene, 1-methyl-3-pentenylene, 1,4-dimethyl-1-butenylene, 1,4-dimethyl-2-butenylene, 1-, 2-, 3-heptenylene, 1-, 2-, 3-octenylene, and the like. With particular preference the "$C_2$-$C_{12}$ alkenylene" comprises branched and unbranched $C_2$-$C_6$ alkenylene groups having one double bond, more particularly branched and unbranched $C_2$-$C_4$ alkenylene groups having one double bond.

The double bonds in the $C_2$-$C_{12}$ alkenylene groups may independently of one another be present in the E- or in Z-configuration or as a mixture of both configurations.

The expression "$C_2$-$C_{12}$ alkenylene" also includes within its definition the expressions "$C_2$-$C_8$ alkenylene" and "$C_2$-$C_6$ alkenylene".

For the purposes of the present invention, the expression "$C_4$-$C_{12}$ alkyl" refers to unbranched or branched alkyl groups having 4 to 12 carbon atoms. These include n-butyl, isobutyl, sec-butyl, tert-butyl, n-pentyl, 2-pentyl, 2-methylbutyl, 3-methylbutyl, 1,2-dimethylpropyl, 1,1-dimethylpropyl, 2,2-dimethylpropyl, 1-ethylpropyl, n-hexyl, 1-methylpentyl, 2-methylpentyl, 1-ethylbutyl, 2-ethylbutyl, n-heptyl, 1-methylhexyl, 2-methylhexyl, 1-ethylpentyl, 2-ethylpentyl, 1-propylbutyl, 1-ethyl-2-methylpropyl, n-octyl, isooctyl, 2-ethylhexyl, n-nonyl, isononyl, 2-propylhexyl, n-decyl, isodecyl, 2-propylheptyl, n-undecyl, isoundecyl, n-dodecyl, isododecyl, and the like. Preferably "$C_4$-$C_{12}$ alkyl" comprises branched or unbranched $C_7$-$C_{12}$ alkylene groups, more particularly branched or unbranched $C_8$-$C_{10}$ alkylene groups.

The expression "$C_4$-$C_{12}$ alkyl" also includes within its definition the expression "$C_7$-$C_{12}$ alkyl".

X in the general formula (I), independently at each occurrence, is preferably an unbranched or branched $C_2$-$C_8$ alkylene group, more preferably an unbranched or branched $C_2$-$C_6$ alkylene group. More particularly, X in the general formula (I), independently at each occurrence, is an unbranched $C_2$-$C_5$ alkylene group, especially 1,3-propylene and 1,4-butylene.

Y in the general formula (I) is preferably an unbranched or branched $C_2$-$C_{12}$ alkylene group, more preferably an unbranched or branched $C_2$-$C_5$ alkylene group. More particularly, Y in the general formula (I) is a branched or unbranched $C_3$-$C_5$ alkylene group, especially 1,2-propylene, 1,3-propylene, and 1,4-butylene, and 2,2-dimethyl-1,3-propylene.

With preference the radicals $R^1$ in the general formula (I), independently of one another, are n-octyl, isooctyl, 2-ethylhexyl, n-nonyl, isononyl, 2-propylhexyl, n-decyl, isodecyl, or 2-propylheptyl. With particular preference the radicals $R^1$ in the general formula (I) are both n-octyl, both isononyl, or both 2-propylheptyl.

The groups X present in the compounds (I) preferably have the same definition.

If the compounds (I) contain more than one group Y, then in a first preferred variant they have the same definition.

If the compounds (I) contain more than one group Y, then in a second variant they have the different definitions.

In a first particularly preferred variant, the groups X present in the compound (I) have the same definition, with the compounds (I) comprising more than one group Y which have different definitions.

In another particularly preferred variant, the groups X and Y present in the compound (I) have the same definition.

In the compounds of the general formula (I), a is preferably an integer from 1 to 70, more preferably an integer from 2 to 50, more particularly an integer from 5 to 40.

On account of their polymeric nature, the compounds of the general formula (I) used in the plasticizer compositions of the invention are not unitary compounds, but are instead mixtures of different compounds. On the one hand, the compounds (I) have different chain lengths, and are characterized accordingly by an average molar mass. On the other hand, both radicals $R^1$, and also the groups X and Y present in the repeating units, may have different definitions. Furthermore, the radicals $R^1$ may comprise isomer mixtures, as defined below.

The polyester plasticizers of the general formula (I) that are present in the plasticizer compositions of the invention generally possess a density at 20° C. to DIN 51757 in the range from 1.000 to 1.200 g/cm3, preferably in the range from 1.010 to 1.170 g/cm3, more preferably in the range from 1.020 to 1.150 g/cm3.

The polyester plasticizers of the general formula (I) that are present in the plasticizer compositions of the invention generally possess a viscosity at 20° C. to DIN EN ISO 3219 in the range from 1000 to 20 000 mPa*s, preferably in the range from 1200 to 15 000 mPa*s, more preferably in the range from 1500 to 14 000 mPa*s. For the determination of the dynamic viscosity according to DIN EN ISO 3219, a small sample of the polymer plasticizer in question is applied by means of disposable pipette to the stator of the rotor-stator unit, consisting of a cone/plate measuring unit 25 mm in diameter, of a suitable rheometer. The dynamic viscosity is subsequently determined by a rotor measurement at 20° C. and 128 rpm.

The polyester plasticizers of the general formula (I) that are present in the plasticizer compositions of the invention generally possess a refractive index nD20 to DIN 51423 in the range from 1.440 to 1.485, preferably in the range from 1.450 to 1.480, more preferably in the range from 1.460 to 1.475.

The polyester plasticizers of the general formula (I) that are present in the plasticizer compositions of the invention generally have a weight average molar mass in the range from 500 to 15 000, preferably in the range from 2000 to 10 000, more preferably in the range from 3000 to 8000. The weight-average molar mass is determined in general by means of gel permeation chromatography (GPC) in tetrahydrofuran against polystyrene standards.

In the compounds of the general formula (II), the radicals $R^2$ and $R^3$, independently of one another, are preferably n-octyl, n-nonyl, isononyl, 2-ethylhexyl, isodecyl, 2-propylheptyl, n-undecyl or isoundecyl.

In a further preferred embodiment, the radicals $R^2$ and $R^3$ in the compounds of the general formula (II) have the same definition.

With particular preference, in the compounds of the general formula (II), the radicals $R^2$ and $R^3$ are both $C_7$-$C_{12}$-alkyl, in particular both 2-ethylhexyl, both isononyl, or both 2-propylheptyl.

A particularly preferred compound of the general formula (II) is di(2-ethylhexyl) terephthalate.

In one preferred embodiment of the present invention, in the compounds of the general formulae (I) and (II), X is an unbranched or branched $C_2$-$C_6$ alkylene group,
Y independently at each occurrence is an unbranched or branched $C_2$-$C_5$ alkylene group,
a is an integer from 5 to 40,
$R^1$ independently at each occurrence is a $C_8$-$C_{10}$ alkyl group, and
$R^2$ and $R^3$ are both a $C_8$-$C_{11}$ alkyl group,
with the groups X present in the compounds (I) having the same definition, In one particularly preferred embodiment of the present invention, in the compounds of the general formulae (I) and (II), X is an unbranched $C_2$-$C_5$ alkylene group,
Y independently at each occurrence is an unbranched or branched $C_3$-$C_5$ alkylene group,
a is an integer from 5 to 40,
$R^1$ radicals are both n-octyl, both isononyl, or both 2-propylheptyl, and
$R^2$ and $R^3$ are both 2-ethylhexyl, are both isononyl or are both 2-propylheptyl,
where the groups X present in the compounds (I) have the same definitions, and the groups Y present in the compounds (I) have different definitions.

Through adaptation of the proportions of the compounds (I) and (II) in the plasticizer composition of the invention, the plasticizer properties may be tailored to the corresponding end use. For use in specific areas of application, it may optionally be useful to add further plasticizers, different from compounds (I) and (II), to the plasticizer composition of the invention. For this reason, the plasticizer composition of the invention may optionally comprise at least one further plasticizer, different from the compounds (I) and (II).

The additional plasticizer different from the compounds (I) and (II) is selected from trimellitic trialkyl esters, benzoic alkyl esters, dibenzoic esters of glycols, hydroxybenzoic esters, esters of saturated monocarboxylic acids, esters of unsaturated monocarboxylic acids, amides and esters of aromatic sulfonic acids, alkylsulfonic esters, glycerol esters, isosorbide esters, phosphoric esters, citric triesters, alkylpyrrolidone derivatives, 2,5-furandicarboxylic esters, 2,5-tetrahydrofurandicarboxylic esters, epoxidized vegetable oils and epoxidized fatty acid monoalkylesters, and polyesters of aliphatic and/or aromatic polycarboxylic acids with at least dihydric alcohols, other than compounds (I).

Suitable trimellitic acid trialkyl esters preferably have, independently of one another, in each case 4 to 13 C atoms, more particularly 7 to 11 C atoms, in the alkyl chains. Suitable benzoic acid alkyl esters preferably have, independently of one another, in each case 7 to 13 C atoms, more particularly 9 to 13 C atoms, in the alkyl chains. Suitable benzoic acid alkyl esters are, for example, isononyl benzoate, isodecyl benzoate, or 2-propylheptyl benzoate. Suitable dibenzoic esters of glycols are diethylene glycol dibenzoate and dibutylene glycol dibenzoate. Suitable esters of saturated monocarboxylic acids are, for example, esters of acetic acid, butyric acid, valeric acid or lactic acid. Suitable esters of unsaturated monocarboxylic acids are, for example, esters of acrylic acid. Suitable alkylsulfonic esters preferably have an alkyl radical with 8 to 22 C atoms. They include, for example, phenyl or cresyl ester of pentadecylsulfonic acid. Suitable isosorbide esters are isosorbide diesters, which are preferably esterified with $C_8$-$C_{13}$ carboxylic acids. Suitable phosphoric esters are tri-2-ethylhexyl phosphate, trioctyl phosphate, triphenyl phosphate, isodecyl diphenyl phosphate, bis(2-ethylhexyl) phenyl phosphate, and 2-ethylhexyl diphenyl phosphate. In the citric triesters, the OH group may be present in free or carboxylated form, preferably acetylated. The alkyl radicals of the acetylated citric triesters preferably independently of one another have 4 to 8 C atoms, more particularly 6 to 8 C atoms. Alkylpyrrolidone derivatives having alkyl radicals of 4 to 18 C atoms are suitable. Suitable 2,5-furandicarboxylic acid dialkyl esters have, independently of one another, in each case 7 to 13 C atoms, preferably 8 to 12 C atoms, in the alkyl chains. Suitable 2,5-tetrahydrofurandicarboxylic acid dialkyl esters have, independently of one another, in each case 7 to 13 C atoms, preferably 8 to 12 C atoms, in the alkyl chains. A suitable epoxidized vegetable oil is, for example, epoxidized soybean oil, available, for example, from Galata-Chemicals, Lampertheim, Germany. Epoxidized fatty acid monoalkyl esters, available, for example, under the trade name ReFlex™ from PolyOne, USA are also suitable.

In all of the cases stated above, the alkyl radicals may in each case be linear or branched and in each case identical or different. Reference is made to the general observations given at the outset regarding suitable and preferred alkyl radicals.

The amount of the at least one further plasticizer, different from the compounds (I) and (II), in the plasticizer composition of the invention is typically 0 to 50 wt %, preferably 0 to 40 wt %, more preferably 0 to 30 wt %, and more particularly 0 to 25 wt %, based on the total amount of the at least one further plasticizer and of the compounds (I) and (II) in the plasticizer composition.

In one preferred embodiment the plasticizer composition of the invention comprises no further plasticizers different from the compounds (I) and (II).

The amount of the compounds of the general formula (I) in the plasticizer composition of the invention is preferably 10 to 99 wt %, more preferably 30 to 98 wt %, and more particularly 40 to 97 wt %, based on the total amount of the compounds (I) and (II) in the plasticizer composition.

The amount of the compounds of the general formula (II) in the plasticizer composition of the invention is preferably 1 to 90 wt %, more preferably 2 to 70 wt %, and more particularly 3 to 60 wt %, based on the total amount of the compounds (I) and (II) in the plasticizer composition.

In the plasticizer composition of the invention, the weight ratio between compounds of the general formula (II) and compounds of the general formula (I) is preferably in the range from 1:100 to 10:1, more preferably in the range from 1:50 to 3:1 and especially in the range from 1:35 to 2:1

Molding Compositions

A further subject of the present invention relates to a molding composition comprising at least one polymer and a plasticizer composition as defined above.

In one preferred embodiment, the polymer present in the molding composition comprises a thermoplastic polymer.

Thermoplastic polymers that are suitable include all polymers which can be processed thermoplastically. More particularly these thermoplastic polymers are selected from:
homopolymers or copolymers comprising in copolymerized form at least one monomer selected from $C_2$-$C_{10}$ monoolefins, such as, for example, ethylene or propylene, 1,3-butadiene, 2-chloro-1,3-butadiene, vinyl alcohol and its $C_2$-$C_{10}$ alkyl esters, vinyl chloride, vinylidene chloride, vinylidene fluoride, tetrafluoroethylene, glycidyl acrylate, glycidyl methacrylate, acrylates and methacrylates with alcohol components from branched and unbranched $C_1$-$C_{10}$ alcohols, vinylaromatics such as, for example, styrene, (meth)acrylonitrile, $\alpha,\beta$-ethylenically unsaturated monocarboxylic and dicarboxylic acids, and maleic anhydride;
homopolymers and copolymers of vinyl acetals;
polyvinyl esters;
polycarbonates (PC);
polyesters, such as polyalkylene terephthalates, polyhydroxyalkenoates (PHA), polybutylenesuccinates (PBS), polybutylenesuccinate adipates (PBSA);
polyethers;
polyetherketones;
thermoplastic polyurethanes (TPU);
polysulfides;
polysulfones;
and mixtures thereof.

Examples include polyacrylates with identical or different alcohol residues from the group of the $C_4$-$C_8$ alcohols, particularly those of butanol, hexanol, octanol, and 2 ethylhexanol, polymethyl methacrylate (PMMA), methyl methacrylate-butyl acrylate copolymers, acrylonitrile-butadiene-styrene copolymers (ABS), ethylene-propylene copolymers, ethylene-propylene-diene copolymers (EPDM), polystyrene (PS), styrene-acrylonitrile copolymers (SAN), acrylonitrile-styrene-acrylate (ASA), styrene-butadiene-methyl methacrylate copolymers (SBMMA), styrene-maleic anhydride copolymers, styrene-methacrylic acid copolymers (SMA), polyoxymethylene (POM), polyvinyl alcohol (PVAL), polyvinyl acetate (PVA), polyvinyl butyral (PVB), polycaprolactone (PCL), polyhydroxybutyric acid (PHB), polyhydroxyvaleric acid (PHV), polylactic acid (PLA), ethylcellulose (EC), cellulose acetate (CA), cellulose propionate (CP), or cellulose acetate/butyrate (CAB).

The at least one thermoplastic polymer present in the molding composition of the invention preferably comprises polyvinyl chloride (PVC), polyvinyl butyral (PVB), homopolymers and copolymers of vinyl acetate, homopolymers and copolymers of styrene, polyacrylates, thermoplastic polyurethanes (TPU), or polysulfides.

Depending on which thermoplastic polymer or thermoplastic polymer mixture is present in the molding composition, different amounts of plasticizer are used. In general the total plasticizer content of the molding composition is 0.5 to 300 phr (parts per hundred resin, i.e., parts by weight per hundred parts by weight of polymer), preferably 0.5 to 130 phr, more preferably 1 to 100 phr.

The at least one thermoplastic polymer present in the molding composition of the invention is especially polyvinyl chloride (PVC).

Polyvinyl chloride is obtained by homopolymerization of vinyl chloride. The polyvinyl chloride (PVC) used in accordance with the invention may be prepared, for example, by suspension polymerization, microsuspension polymerization, emulsion polymerization, or bulk polymerization. The preparation of PVC by polymerization of vinyl chloride, and production and composition of plasticized PVC, are described in, for example, "Becker/Braun, Kunststoff-Handbuch, volume 2/1: Polyvinylchlorid", $2^{nd}$ edition, Carl Hanser Verlag, Munich.

For the PVC plasticized in accordance with the invention, the K value, which characterizes the molar mass of the PVC and is determined according to DIN 53726, is usually between 57 and 90, preferably between 61 and 85, more particularly between 64 and 80.

For the purposes of the invention, the amount of PVC in the mixtures is 20 to 95 wt %, preferably 40 to 90 wt %, and more particularly 45 to 85 wt %.

Where the thermoplastic polymer in the molding compositions of the invention is polyvinyl chloride, the total plasticizer content of the molding composition is 1 to 300 phr, preferably 5 to 150 phr, more preferably 10 to 130 phr, and more particularly 15 to 120 phr.

A further subject of the present invention relates to molding compositions comprising at least one elastomer and at least one plasticizer composition as defined above.

The elastomer present in the molding compositions of the invention is preferably at least one natural rubber (NR), or at least one synthetically produced rubber, or mixtures thereof. Examples of preferred rubbers produced synthetically are polyisoprene rubber (IR), styrene-butadiene rubber (SBR), butadiene rubber (BR), nitrile-butadiene rubber (NBR), or chloroprene rubber (CR).

Preferred rubbers or rubber mixtures are those which can be vulcanized with sulfur.

For the purposes of the invention, the amount of elastomer in the molding compositions of the invention is 20% to 95 wt %, preferably is 45% to 90 wt %, and more particularly 50 to 85 wt %.

For the purposes of the invention, the molding compositions which comprise at least one elastomer may comprise other suitable adjuvants, in addition to the ingredients above. For example, there may be reinforcing fillers present, such as carbon black or silicon dioxide, further fillers, a methylene donor, such as hexamethylenetetramine (HMT), a methylene acceptor, such as phenolic resins modified with cardanol (from cashew nuts), a vulcanizing or crosslinking agent, a vulcanizing or crosslinking accelerator, activators, various types of oil, aging inhibitors, and other various adjuvants which are incorporated, for example, into tire compounds and other rubber compounds, for example.

Where the polymer in the molding compositions of the invention comprises rubbers, the content of the plasticizer composition of the invention, as defined above, if the molding composition is 1 to 60 phr, preferably 1 to 40 phr, more preferably 2 to 30 phr.

Molding Composition Adjuvants

For the purposes of the invention, the molding compositions comprising at least one thermoplastic polymer may comprise other suitable adjuvants. Examples that may be present include stabilizers, lubricants, fillers, pigments, flame retardants, light stabilizers, blowing agents, polymeric processing assistants, impact tougheners, optical brighteners, antistats, or biostabilizers.

A number of suitable adjuvants are described in more detail below. The examples given, however, do not impose any restriction on the molding compositions of the invention, but instead serve merely for elucidation. All amount details are in wt % figures, based on the molding composition as a whole.

Stabilizers contemplated include all customary PVC stabilizers in solid and liquid form, examples being customary Ca/Zn, Ba/Zn, Pb or Sn stabilizers, and also acid-binding phyllosilicates, such as hydrotalcite.

The molding compositions of the invention may have a stabilizer content of 0.05% to 7%, preferably 0.1% to 5%, more preferably of 0.2% to 4%, and more particularly of 0.5% to 3%.

Lubricants reduce the adhesion between the plastics to be processed and metal surfaces and ought to counteract frictional forces during mixing, plastifying, and deforming.

The molding compositions of the invention may comprise, as lubricants, all lubricants customary for the processing of plastics. Those contemplated include, for example hydrocarbons, such as oils, paraffins, and PE waxes, fatty alcohols having 6 to 20 carbon atoms, ketones, carboxylic acids, such as fatty acids and montanic acid, oxidized PE wax, metal salts of carboxylic acids, carboxamides, and also carboxylic esters, examples being those with the alcohols ethanol, fatty alcohols, glycerol, ethanediol, pentaerythritol, and long-chain carboxylic acids as acid component.

The molding compositions of the invention may have a lubricant content of 0.01% to 10%, preferably 0.05% to 5%, more preferably of 0.1% to 3%, and more particularly of 0.2% to 2%.

Fillers influence in particular the compressive strength, tensile strength, and flexural strength, and also the hardness and heat distortion resistance, of plasticized PVC in a positive way.

For the purposes of the invention, the molding compositions may also comprise fillers, such as, for example, carbon black and other organic fillers, such as natural calcium carbonates, as for example chalk, limestone, and marble, synthetic calcium carbonates, dolomite, silicates, silica, sand, diatomaceous earth, aluminum silicates, such as kaolin, mica, and feldspar. Preferred fillers used are calcium carbonates, chalk, dolomite, kaolin, silicates, talc, or carbon black.

The molding compositions of the invention may have a filler content of 0.01% to 80%, preferably 0.1 to 60%, more preferably of 0.5 to 50%, and more particularly of 1% to 40%.

The molding compositions of the invention may also comprise pigments, in order to adapt the resulting product to different possible applications.

For the purposes of the present invention, both inorganic pigments and organic pigments may be used. Inorganic pigments used may be, for example, cobalt pigments, such as $CoO/Al_2O_3$, and chromium pigments, as for example $Cr_2O_3$. Organic pigments contemplated include, for example, monoazo pigments, condensed azo pigments, azomethine pigments, anthraquinone pigments, quinacridones, phthalocyanine pigments and dioxazine pigments.

The molding compositions of the invention may have a pigment content of 0.01% to 10%, preferably 0.05% to 5%, more preferably of 0.1% to 3%, and more particularly of 0.5% to 2%.

In order to reduce flammability and to reduce the level of smoke given off on burning, the molding compositions of the invention may also comprise flame retardants.

Examples of flame retardants which can be used include antimony trioxide, phosphate esters, chlorinated paraffin, aluminum hydroxide and boron compounds.

The molding compositions of the invention may have a flame retardant content of 0.01% to 10%, preferably 0.1% to 8%, more preferably of 0.2% to 5%, and more particularly of 0.5% to 2%.

In order to protect articles produced from the molding compositions of the invention from surface-region damage due to the influence of light, the molding compositions may also comprise light stabilizers, for example, UV absorbers.

For the purposes of the present invention it is possible to use hydroxybenzophenones, hydroxyphenylbenzotriazoles, cyanoacrylates or what are known as hindered amine light stabilizers (HALS) such as the derivatives of 2,2,6,6-tetramethylpiperidine, for example, as light stabilizers.

The molding compositions of the invention may have a light stabilizer content, for example UV absorber, of 0.01% to 7%, preferably 0.1% to 5%, more preferably of 0.2% to 4%, and more particularly of 0.5% to 3%.

Preparation of the Compounds of the General Formula (I)

The polyester plasticizers of the invention are prepared in a manner which is conventional technically, as described in WO 02/038531, for example, by esterification of aliphatic dicarboxylic acids with diols in the presence of monohydric alcohols as capping groups, and of an esterification catalyst. The chain length or average molar weight of the polyester plasticizers is controlled via the addition ratio of the dicarboxylic acids to the dialcohols.

The dicarboxylic acids used in preparing the polyester plasticizers of the general formula (I) are preferably unbranched or branched $C_2$-$C_6$ alkyldicarboxylic acids, more preferably unbranched $C_2$-$C_5$ alkyldicarboxylic acids. The dicarboxylic acids used in preparing the polyester plasticizers of the general formula (I) are, more particularly, glutaric acid and/or adipic acid, especially adipic acid.

The diols used in preparing the polyester plasticizers of the general formula (I) are preferably unbranched or branched $C_2$-$C_8$ alkyldiols, more preferably unbranched and branched $C_2$-$C_6$ alkyldiols, such as, for example, 1,2-ethanediol, 1,2-propanediol, 1,3-propanediol, 1,2-butanediol, 1,3-butanediol, 1,4-butanediol, 1,2-pentanediol, 1,3-pentanediol, 2-methyl-1,3-pentanediol, 2,2-dimethyl-1,3-pentanediol, 1,4-pentanediol, 1,5-pentanediol, 1,2-hexanediol, 1,3-hexanediol, 1,4-hexanediol, 1,5-hexanediol, 1,6-hexanediol, or mixtures of these diols. More particularly, the diols used in preparing the polyester plasticizers of the general formula (I) are 1,2-propanediol, 1,3-butanediol, 1,4-butanediol, 2,2-dimethyl-1,3-propanediol, or mixtures of these diols.

The monohyric alcohols which are used as a chain cap in preparing the polyester plasticizers of the general formula (I) are preferably unbranched or branched $C_7$-$C_{12}$ alkanols, more preferably n-octanol, isooctanol, 2-ethylhexanol, n-nonanol, isononanol, 2-propylhexanol, n-decanol, isodecanol, 2-propylheptanol, or mixtures of these alcohols and especially n-octanol, isononanol, 2-propylheptanol, or mixtures of these alcohols.

The plasticizer composition of the invention especially comprises at least one compound of the general formula (I) prepared using the following starting materials:

adipic acid, 1,2-propanediol, and n-octanol, or adipic acid, 1,2-propanediol, 2,2-dimethyl-1,3-propanediol, and isononanol, or adipic acid, 1,4-butanediol, 2,2-dimethyl-1,3-propanediol and isononanol.

Esterification catalysts used are generally the catalysts customary for that purpose, examples being mineral acids, such as sulfuric acid and phosphoric acid; organic sulfonic acids, such as methanesulfonic acid and p-toluenesulfonic acid; amphoteric catalysts, more particularly compounds of titanium, tin(IV) compounds, or zirconium compounds, such as tetraalkoxytitaniums, e.g., tetrabutoxytitanium, and tin (IV) oxide.

The esterification catalyst is used an effective amount, which is typically in the range from 0.05 to 10 wt %, preferably 0.1 to 5 wt %, based on the sum of acid component and alcohol component.

Further suitable methods for preparing the compounds of the general formula (I) by means of esterification are described in, for example, U.S. Pat. Nos. 6,310,235, 5,324,853, DE-A 2612355 or DE-A 1945359. The documents cited are hereby referenced in full.

The esterification may in general take place at ambient pressure or under reduced or elevated pressure. The esterification is preferably conducted at ambient pressure or reduced pressure.

The esterification can be carried out in the absence of an added solvent, or in the presence of an organic solvent.

If the esterification is carried out in the presence of a solvent, the solvent in question is preferably an organic solvent which is inert under the reaction conditions. Such solvents include, for example, aliphatic hydrocarbons, halogenated aliphatic hydrocarbons, aromatic and substituted aromatic hydrocarbons, or ethers. The solvent is selected preferably from pentane, hexane, heptanes, ligroin, petroleum ether, cyclohexane, dichloromethane, trichloromethane, carbon tetrachloride, benzene, toluene, xylene, chlorobenzene, dichlorobenzenes, dibutyl ether, THF, dioxane, and mixtures thereof.

The esterification is carried out customarily within a temperature range from 50 to 250° C.

Where the esterification catalyst is selected from organic acids or mineral acids, the esterification is conducted typically in a temperature range from 50 to 160° C.

Where the esterification catalyst is selected from amphoteric catalysts, the esterification is carried out customarily within a temperature range from 100 to 250° C.

The esterification may take place in the presence or absence of an inert gas. An inert gas, generally speaking, is a gas which under the existing reaction conditions, does not enter into any reactions with reactants participating in the reaction, or with reagents, or with solvents, or with the products formed.

In one preferred embodiment, for example, adipic acid, 1,4-butanediol, neopentyl glycol, isononanol, and also isopropyl butyl titanate as esterification catalyst are charged to a reaction vessel, heated initially to 100° C. to 140° C., and homogenized by stirring. The reaction mixture is then heated at 160° C. to 190° C. under atmospheric pressure. The esterification, with elimination of water, begins at about 150° C. The water of reaction formed is separated off by distillation via a column. Alcohol components which have distilled over are separated off and returned. The reaction mixture is subsequently heated further to 200° C. to 250° C., a reduced pressure of 150 mbar to 300 mbar is applied, and further water of reaction is removed from the reaction mixture by passing nitrogen through it. The reaction mixture is stirred under reduced pressure and with nitrogen passed through it, at 200° C. to 250° C., until the acid number of the reaction mixture has reached a level of <15 mg KOH/g.

Subsequently, for final esterification, the reaction mixture is pumped into a second vessel and is stirred at 200° C. to 250° C., under a reduced pressure of 10 mbar to 150 mbar, and with removal of residual water and excess isononanol by the passing of an increased nitrogen stream through the reaction mixture, until the acid number of the reaction mixture has reached the level of <1.0 mg KOH/g. Thereafter the reaction product is also filtered at 100° C. to 140° C.

The aliphatic dicarboxylic acids, diols, and monohydric alcohols used in preparing the compounds of the general formula (I) may either be acquired commercially or prepared by synthesis routes that are known from the literature.

Commercially available polyester plasticizers may also be used as polyester plasticizers of the general formula (I). Examples of suitable commercially available polyester plasticizers are those which are available under the tradenames Palamoll® 638, Palamoll® 652, Palamoll® 654, or Palamoll® 656, from BASF SE, Ludwigshafen.

Compounds of the General Formula (II)

The compounds of the general formula (II) may be either acquired commercially or prepared by methods known in the prior art.

In general the dialkyl terephthalates are obtained by esterification of terephthalic acid or suitable derivatives thereof with the corresponding alcohols. The esterification may take place by customary methods known to the skilled person.

A common feature of the methods for preparing the compounds of the general formula (II) is that starting from terephthalic acid or suitable derivatives thereof, an esterification or a transesterification is carried out, with the corresponding $C_4$-$C_{12}$-alkanols being used as reactants. These alcohols are generally not pure substances, but are instead isomer mixtures whose composition and degree of purity are dependent on the particular method by which they are prepared.

Preferred $C_4$-$C_{12}$ alkanols which are used in preparing the compounds (I) and (II) present in the plasticizer composition of the invention may be straight-chain or branched or may consist of mixtures of straight-chain and branched $C_4$-$C_{12}$ alkanols. They include n-butanol, isobutanol, n-pentanol, isopentanol, n-hexanol, isohexanol, n-heptanol, isoheptanol, n-octanol, isooctanol, 2-ethylhexanol, n-nonanol, isononanol, isodecanol, 2-propylheptanol, n-undecanol, isoundecanol, n-dodecanol or isododecanol. Particular preference is given to $C_7$-$C_{12}$ alkanols, in particular, 2-ethylhexanol, isononanol and 2-propylheptanol, especially 2-ethylhexanol.

Compounds of the general formula II are available commercially. An example of a suitable commercially available plasticizer of the general formula II is di(2-ethylhexyl) terephthalate (DOTP), which is available under the brand name Palationol® DOTP, from BASF Corp., Florham Park, N.J., USA.

Heptanol

The heptanols used in preparing the compounds of the general formulae (I) and (II) may be straight-chain or branched or may consist of mixtures of straight-chain and branched heptanols. Preference is given to using mixtures of branched heptanols, also called isoheptanol, which are prepared by the rhodium-catalyzed, or preferably cobalt-catalyzed hydroformylation of dimer propene, obtainable for example by the Dimersol® process, and subsequent hydrogenation of the resulting isoheptanals to give an isoheptanol mixture. In accordance with its preparation, the isoheptanol mixture thus obtained consists of a plurality of isomers. Substantially straight-chain heptanols may be obtained by the rhodium-catalyzed or preferably cobalt-catalyzed hydroformylation of 1-hexene and subsequent hydrogenation of the resultant n-heptanal to n-heptanol. The hydroformylation of 1-hexene or dimer propene may take place according to processes known per se: In the case of the hydroformylation with rhodium catalysts dissolved homogeneously in the reaction medium, it is possible to use as catalyst not only noncomplexed rhodium carbonyls, which are formed in situ under the conditions of the hydroformylation reaction in the hydroformylation mixture under the action of synthesis gas, from rhodium salts, for example, but also complex rhodium carbonyl compounds, more particularly complexes with organic phosphines, such as triphenylphosphine, or organophosphates, preferably chelating biphosphites, as described in U.S. Pat. No. 5,288,918, for example. In the case of the cobalt-catalyzed hydroformylation of these olefins, cobalt carbonyl compounds are generally used which are homogeneously soluble in the reaction mixture and which form from cobalt salts under the conditions of the hydroformylation reaction under the action of synthesis gas. Where the cobalt-catalyzed hydroformylation is performed in the presence of trialkyl- or triarylphosphines, the desired heptanols are formed directly as the hydroformylation product, meaning that there is no further need for hydrogenation of the aldehyde function.

Examples of suitable processes for the cobalt-catalyzed hydroformylation of the 1-hexene or of the hexene isomer mixtures are those industrially established processes elucidated in Falbe, New Syntheses with Carbon Monoxide, Springer, Berlin, 1980, on pages 162-168, such as the Ruhrchemie process, the BASF process, the Kuhlmann process, or the Shell process. While the Ruhrchemie, BASF, and Kuhlmann processes operate with non-ligand-modified cobalt carbonyl compounds as catalysts, and produce hexanel mixtures, the Shell process (DE-A 1593368) uses phosphine or phosphite ligand-modified cobalt carbonyl compounds as catalyst, which by virtue of their additional high hydrogenation activity lead directly to the hexanol mixtures. Advantageous embodiments for the implementation of the hydroformylation with non-ligand-modified cobalt carbonyl complexes are described in detail in DE-A 2139630, DE-A 2244373, DE-A 2404855, and WO 01014297.

The rhodium-catalyzed hydroformylation of 1-hexene or of the hexene isomer mixtures can use the established industrial low-pressure rhodium hydroformylation process with triphenylphosphine-ligand-modified rhodium carbonyl compounds, which is subject matter of U.S. Pat. No. 4,148,830. Non-ligand-modified rhodium carbonyl compounds can serve advantageously as catalyst for the rhodium-catalyzed hydroformylation of long-chain olefins, for example of the hexene isomer mixtures obtained by the processes described above; this differs from the low-pressure process in requiring a higher pressure of from 80 to 400 bar. The conduct of high-pressure rhodium hydroformylation processes of this type is described by way of example in EP-A 695734, EP-B 880494, and EP-B 1047655.

The isoheptanal mixtures obtained after hydroformylation of the hexene isomer mixtures are catalytically hydrogenated in a manner that is per se conventional to give isoheptanol mixtures. For this purpose it is preferable to use heterogeneous catalysts which comprise, as catalytically active component, metals and/or metal oxides of groups VI to VIII, or else of transition group I, of the Periodic Table of the Elements, in particular chromium, molybdenum, manganese, rhenium, iron, cobalt, nickel, and/or copper, optionally deposited on a support material such as $Al_2O_3$, $SiO_2$ and/or $TiO_2$. Catalysts of this type are described by way of example in DE-A 3228881, DE-A 2628987, and DE-A 2445303. It is particularly advantageous to carry out the hydrogenation of the isoheptanals with an excess of hydrogen of from 1.5 to 20% above the stoichiometric amount of hydrogen needed for the hydrogenation of the isoheptanals, at temperatures of from 50 to 200° C., and at a hydrogen pressure of from 25 to 350 bar, and for avoidance of side-reactions to add, during the course of the hydrogenation, in accordance with DE-A 2628987, a small amount of water, advantageously in the form of an aqueous solution of an alkali metal hydroxide or alkali metal carbonate, in accordance with the teaching of WO 01087809.

Octanol

For many years, 2-ethylhexanol was the largest-production-quantity plasticizer alcohol, and it can be obtained through the aldol condensation of n-butyraldehyde to give 2-ethylhexenal and subsequent hydrogenation thereof to give 2-ethylhexanol (see Ullmann's Encyclopedia of Industrial Chemistry; $5^{th}$ edition, vol. A 10, pp. 137-140, VCH Verlagsgesellschaft GmbH, Weinheim 1987).

Substantially straight-chain octanols can be obtained via rhodium- or preferably cobalt-catalyzed hydroformylation of 1-heptene and subsequent hydrogenation of the resultant n-octanal to give n-octanol. The 1-heptene needed for this purpose can be obtained from the Fischer-Tropsch synthesis of hydrocarbons.

By virtue of the production route used for the alcohol isooctanol, it is not a unitary chemical compound, in contrast to 2-ethylhexanol or n-octanol, but instead is an isomer mixture of variously branched $C_8$ alcohols, for example of 2,3-dimethyl-1-hexanol, 3,5-dimethyl-1-hexanol, 4,5-dimethyl-1-hexanol, 3-methyl-1-heptanol, and 5-methyl-1-heptanol; these can be present in the isooctanol in various quantitative proportions which depend on the production conditions and production processes used. Isooctanol is usually produced via codimerization of propene with butenes, preferably n-butenes, and subsequent hydroformylation of the resultant mixture of heptene isomers. The octanal isomer mixture obtained in the hydroformylation can subsequently be hydrogenated to give the isooctanol in a manner that is conventional per se.

The codimerization of propene with butenes to give isomeric heptenes can advantageously be achieved with the aid of the homogeneously catalyzed Dimersol® process (Chauvin et al; Chem. Ind.; May 1974, pp. 375-378), which uses, as catalyst, a soluble nickel phosphine complex in the presence of an ethylaluminum chlorine compound, for example ethylaluminum dichloride. Examples of phosphine ligands that can be used for the nickel complex catalyst are tributylphosphine, triisopropyl-phosphine, tricyclohexyl-phosphine, and/or tribenzylphosphine. The reaction takes place at temperatures of from 0 to 80° C., and it is advantageous here to set a pressure at which the olefins are present in solution in the liquid reaction mixture (Cornils; Hermann: Applied Homogeneous Catalysis with Organometallic Compounds; $2^{nd}$ edition, vol. 1; pp. 254-259, Wiley-VCH, Weinheim 2002).

In an alternative to the Dimersol® process operated with nickel catalysts homogeneously dissolved in the reaction medium, the codimerization of propene with butenes can also be carried out with a heterogeneous NiO catalyst deposited on a support; heptene isomer distributions obtained here are similar to those obtained in the homogeneously catalyzed process. Catalysts of this type are by way of example used in what is known as the Octol® process (Hydrocarbon Processing, February 1986, pp. 31-33), and a specific heterogeneous nickel catalyst with good suitability for olefin dimerization or olefin codimerization is disclosed by way of example in WO 9514647.

Codimerization of propene with butenes can also use, instead of nickel-based catalysts, heterogeneous Brønsted-acid catalysts; heptenes obtained here are generally more highly branched than in the nickel-catalyzed processes. Examples of catalysts suitable for this purpose are solid phosphoric acid catalysts, e.g. phosphoric-acid-impregnated kieselguhr or diatomaceous earth, these being as utilized in the PolyGas® process for olefin dimerization or olefin oligomerization (Chitnis et al; Hydrocarbon Engineering 10, No. 6—June 2005). Brønsted-acid catalysts that have very good suitability for the codimerization of propene and butenes to give heptenes are zeolites, which are used in the EMOGAS® process, a further development based on the PolyGas® process.

The 1-heptene and the heptene isomer mixtures are converted to n-octanal and, respectively, octanal isomer mixtures by the known processes explained above in connection with the production of n-heptanal and heptanal isomer mixtures, by means of rhodium- or cobalt-catalyzed hydroformylation, preferably cobalt-catalyzed hydroformylation. These are then hydrogenated to give the corresponding octanols, for example by means of one of the catalysts mentioned above in connection with production of n-heptanol and of isoheptanol.

Nonanol

Substantially straight-chain nonanol can be obtained via rhodium- or preferably cobalt-catalyzed hydroformylation of 1-octene and subsequent hydrogenation of the resultant n-nonanal. The starting olefin 1-octene can be obtained by way of example by way of ethylene oligomerization by means of a nickel complex catalyst that is homogenously soluble in the reaction medium—1,4-butanediol—with, for example, diphenyl-phosphinoacetic acid or 2-diphenylphosphinobenzoic acid as ligand. This process is also known as the Shell Higher Olefins Process or SHOP process (see Weisermel, Arpe: Industrielle Organische Chemie [Industrial organic chemistry]; $5^{th}$ edition, p. 96; Wiley-VCH, Weinheim 1998).

Isononanol which is used for the synthesis of the diisononyl esters of the general formulae (I) and (II) comprised in the plasticizer composition of the invention, is not a unitary chemical compound, but instead is a mixture of variously branched, isomeric $C_9$-alcohols which can have various degrees of branching depending on the manner in which they were produced, and also in particular on the starting materials used. The isononanols are generally produced via dimerization of butenes to give isooctene mixtures, subsequent hydroformylation of the isooctene mixtures, and hydrogenation of the resultant isononanal mixtures to give isononanol mixtures, as explained in Ullmann's Encyclopedia of Industrial Chemistry, $5^{th}$ edition, vol. A1. pp. 291-292, VCH Verlagsgesellschaft GmbH, Weinheim 1995.

Both isobutene, cis- and trans-2-butene, and also 1-butene, or a mixture of these butene isomers, can be used as starting material for the production of the isononanols. The dimerization of pure isobutene, mainly catalyzed by means of liquid, e.g., sulfuric acid or phosphoric acid, or by means of solid, e.g., phosphoric acid applied to kieselguhr, $SiO_2$, or $Al_2O_3$, as support material, or zeolites, or Brønsted acids, mainly gives the highly branched compound 2,4,4-trimethylpentene, also termed diisobutylene, which gives highly branched isononanols after hydroformylation and hydrogenation of the aldehyde.

Preference is given to isononanols with a low degree of branching. Isononanol mixtures of this type with little branching are prepared from the linear butenes 1-butene, cis- and/or trans-2-butene, which optionally can also comprise relatively small amounts of isobutene, by way of the route described above involving butene dimerization, hydroformylation of the isooctene, and hydrogenation of the resultant isononanal mixtures. A preferred raw material is what is known as raffinate II, which is obtained from the $C_4$ cut of a cracker, for example of a steam cracker, after elimination of allenes, acetylenes, and dienes, in particular 1,3-butadiene, via partial hydrogenation thereof to give linear butenes, or removal thereof via extractive distillation, for example by means of N-methylpyrrolidone, and subsequent Brønsted-acid catalyzed removal of the isobutene comprised therein via reaction thereof with methanol or isobutanol by established large-scale-industrial processes with formation of the fuel additive methyl tert-butyl ether (MTBE), or of the isobutyl tert-butyl ether that is used to obtain pure isobutene.

Raffinate II also comprises, alongside 1-butene and cis- and trans-2-butene, n- and isobutane, and residual amounts of up to 5% by weight of isobutene.

The dimerization of the linear butenes or of the butene mixture comprised in raffinate II can be carried out by means of the familiar processes used on a large industrial scale, for example those explained above in connection with the production of isoheptene mixtures, for example by means of heterogeneous, Brønsted-acid catalysts such as those used in the PolyGas® process or EMOGAS® process, by means of the Dimersol® process with use of nickel complex catalysts homogeneously dissolved in the reaction medium, or by means of heterogeneous, nickel(II)-oxide-containing catalysts by the Octol® process or by the process of WO 9514647. The resultant isooctene mixtures are converted to isononanol mixtures by the known processes explained above in connection with the production of heptanal isomer mixtures, by means of rhodium or cobalt-catalyzed hydroformylation, preferably cobalt-catalyzed hydroformylation. These are then hydrogenated to give the suitable isononanol mixtures, for example by means of one of the catalysts mentioned above in connection with the production of isoheptanol.

The resultant isononanol isomer mixtures can be characterized by way of their iso-index, which can be calculated from the degree of branching of the individual, isomeric isononanol components in the isononanol mixture multiplied by the percentage proportion of these in the isononanol mixture: by way of example, n-nonanol contributes the value 0 to the iso-index of an isononanol mixture, methyloctanols (single branching) contribute the value 1, and dimethylheptanols (double branching) contribute the value 2. The higher the linearity, the lower the iso-index of the relevant isononanol mixture. Accordingly, the iso-index of an isononanol mixture can be determined via gas-chromatographic separation of the isononanol mixture into its individual isomers and attendant quantification of the percentage quantitative proportion of these in the isononanol mixture, determined by standard methods of gas-chromatographic analysis. In order to increase the volatility of the isomeric nonanols and improve the gas-chromatographic separation of these, they are advantageously trimethylsilylated by means of standard methods, for example via reaction with N-methyl-N-trimethylsilyltrifluoroacetamide, prior to gas-chromatographic analysis. In order to achieve maximum quality of separation of the individual components during gas-chromatographic analysis, it is preferable to use capillary columns with polydimethylsiloxane as stationary phase. Capillary columns of this type are obtainable commercially, and a little routine experimentation by the person skilled in the art is all that is needed in order to select, from the many different products available commercially, one that has ideal suitability for this separation task.

The diisononyl esters of the general formulae (I) and (II) used in the plasticizer composition of the invention have generally been esterified with isononanols with an iso index of from 0.8 to 2, preferably from 1.0 to 1.8, and particularly preferably from 1.1 to 1.5, which can be produced by the abovementioned processes.

Possible compositions of isononanol mixtures that can be used for the production of the compounds of the general formulae (I) and (II) used in accordance with the invention are stated below merely by way of example, and it should be noted here that the proportions of the isomers individually listed within the isononanol mixture can vary, depending on the composition of starting material, for example raffinate II, the composition of butenes in which can vary with the production process, and on variations in the production conditions used, for example the age of the catalysts utilized, and conditions of temperature and of pressure, which have to be adjusted appropriately thereto.

By way of example, an isononanol mixture produced via cobalt-catalyzed hydroformylation and subsequent hydrogenation from an isooctene mixture produced with use of raffinate II as raw material by means of the catalyst and process in accordance with WO 9514647 can have the following composition:

from 1.73 to 3.73% by weight, preferably from 1.93 to 3.53% by weight, particularly preferably from 2.23 to 3.23% by weight of 3-ethyl-6-methylhexanol;
from 0.38 to 1.38% by weight, preferably from 0.48 to 1.28% by weight, particularly preferably from 0.58 to 1.18% by weight of 2,6-dimethylheptanol;
from 2.78 to 4.78% by weight, preferably from 2.98 to 4.58% by weight, particularly preferably from 3.28 to 4.28% by weight of 3,5-dimethylheptanol;
from 6.30 to 16.30% by weight, preferably from 7.30 to 15.30% by weight, particularly preferably from 8.30 to 14.30% by weight of 3,6-dimethylheptanol;
from 5.74 to 11.74% by weight, preferably from 6.24 to 11.24% by weight, particularly preferably from 6.74 to 10.74% by weight of 4,6-dimethylheptanol;
from 1.64 to 3.64% by weight, preferably from 1.84 to 3.44% by weight, particularly preferably from 2.14 to 3.14% by weight of 3,4,5-trimethylhexanol;
from 1.47 to 5.47% by weight, preferably from 1.97 to 4.97% by weight, particularly preferably from 2.47 to 4.47% by weight of 3,4,5-trimethylhexanol, 3-methyl-4-ethylhexanol and 3-ethyl-4-methylhexanol;
from 4.00 to 10.00% by weight, preferably from 4.50 to 9.50% by weight, particularly preferably from 5.00 to 9.00% by weight of 3,4-dimethylheptanol;
from 0.99 to 2.99% by weight, preferably from 1.19 to 2.79% by weight, particularly preferably from 1.49 to 2.49% by weight of 4-ethyl-5-methylhexanol and 3-ethylheptanol;
from 2.45 to 8.45% by weight, preferably from 2.95 to 7.95% by weight, particularly preferably from 3.45 to 7.45% by weight of 4,5-dimethylheptanol and 3-methyloctanol;
from 1.21 to 5.21% by weight, preferably from 1.71 to 4.71% by weight, particularly preferably from 2.21 to 4.21% by weight of 4,5-dimethylheptanol;
from 1.55 to 5.55% by weight, preferably from 2.05 to 5.05% by weight, particularly preferably from 2.55 to 4.55% by weight of 5,6-dimethylheptanol;
from 1.63 to 3.63% by weight, preferably from 1.83 to 3.43% by weight, particularly preferably from 2.13 to 3.13% by weight of 4-methyloctanol;
from 0.98 to 2.98% by weight, preferably from 1.18 to 2.78% by weight, particularly preferably from 1.48 to 2.48% by weight of 5-methyloctanol;
from 0.70 to 2.70% by weight, preferably from 0.90 to 2.50% by weight, particularly preferably from 1.20 to 2.20% by weight of 3,6,6-trimethylhexanol;
from 1.96 to 3.96% by weight, preferably from 2.16 to 3.76% by weight, particularly preferably from 2.46 to 3.46% by weight of 7-methyloctanol;
from 1.24 to 3.24% by weight, preferably from 1.44 to 3.04% by weight, particularly preferably from 1.74 to 2.74% by weight of 6-methyloctanol;
from 0.1 to 3% by weight, preferably from 0.2 to 2% by weight, particularly preferably from 0.3 to 1% by weight of n-nonanol;
from 25 to 35% by weight, preferably from 28 to 33% by weight, particularly preferably from 29 to 32% by weight of other alcohols having 9 and 10 carbon atoms; with the proviso that the entirety of the components mentioned gives 100% by weight.

In accordance with what has been said above, an isononanol mixture produced via cobalt-catalyzed hydroformylation and subsequent hydrogenation with use of an isooctene mixture produced by means of the PolyGas® process or EMOGAS® process with an ethylene-containing butene mixture as raw material can vary within the range of the compositions below, depending on the composition of the raw material and variations in the reaction conditions used:

from 6.0 to 16.0% by weight, preferably from 7.0 to 15.0% by weight, particularly preferably from 8.0 to 14.0% by weight of n-nonanol;
from 12.8 to 28.8% by weight, preferably from 14.8 to 26.8% by weight, particularly preferably from 15.8 to 25.8% by weight of 6-methyloctanol;
from 12.5 to 28.8% by weight, preferably from 14.5 to 26.5% by weight, particularly preferably from 15.5 to 25.5% by weight of 4-methyloctanol;
from 3.3 to 7.3% by weight, preferably from 3.8 to 6.8% by weight, particularly preferably from 4.3 to 6.3% by weight of 2-methyloctanol;
from 5.7 to 11.7% by weight, preferably from 6.3 to 11.3% by weight, particularly preferably from 6.7 to 10.7% by weight of 3-ethylheptanol;
from 1.9 to 3.9% by weight, preferably from 2.1 to 3.7% by weight, particularly preferably from 2.4 to 3.4% by weight of 2-ethylheptanol;
from 1.7 to 3.7% by weight, preferably from 1.9 to 3.5% by weight, particularly preferably from 2.2 to 3.2% by weight of 2-propylhexanol;
from 3.2 to 9.2% by weight, preferably from 3.7 to 8.7% by weight, particularly preferably from 4.2 to 8.2% by weight of 3,5-dimethylheptanol;
from 6.0 to 16.0% by weight, preferably from 7.0 to 15.0% by weight, particularly preferably from 8.0 to 14.0% by weight of 2,5-dimethylheptanol;
from 1.8 to 3.8% by weight, preferably from 2.0 to 3.6% by weight, particularly preferably from 2.3 to 3.3% by weight of 2,3-dimethylheptanol;
from 0.6 to 2.6% by weight, preferably from 0.8 to 2.4% by weight, particularly preferably from 1.1 to 2.1% by weight of 3-ethyl-4-methylhexanol;
from 2.0 to 4.0% by weight, preferably from 2.2 to 3.8% by weight, particularly preferably from 2.5 to 3.5% by weight of 2-ethyl-4-methylhexanol;
from 0.5 to 6.5% by weight, preferably from 1.5 to 6% by weight, particularly preferably from 1.5 to 5.5% by weight of other alcohols having 9 carbon atoms; with the proviso that the entirety of the components mentioned gives 100% by weight.

Decanol

Isodecanol, which is used for the synthesis of the diisodecyl esters of the general formulae (I) and (II) comprised in the plasticizer composition of the invention, is not a unitary chemical compound, but instead is a complex mixture of differently branched isomeric decanols.

These are generally produced via nickel- or Brønsted-acid-catalyzed trimerization of propylene, for example by the PolyGas® process or the EMOGAS® process explained above, subsequent hydroformylation of the resultant isononene isomer mixture by means of homogeneous rhodium or cobalt carbonyl catalysts, preferably by means of cobalt carbonyl catalysts, and hydrogenation of the resultant isodecanal isomer mixture, e.g. by means of the catalysts and processes mentioned above in connection with the production of $C_7$-$C_9$-alcohols (Ullmann's Encyclopedia of Industrial Chemistry; $5^{th}$ edition, vol. A1, p. 293, VCH Verlagsgesellschaft GmbH, Weinheim 1985). The resultant isodecanol generally has a high degree of branching.

2-Propylheptanol, which is used for the synthesis of the di(2-propylheptyl) esters of the general formulae (I) and (II) comprised in the plasticizer composition of the invention, can be pure 2-propylheptanol or can be propylheptanol isomer mixtures of the type generally formed during the industrial production of 2-propylheptanol and likewise generally termed 2-propylheptanol.

Pure 2-propylheptanol can be obtained via aldol condensation of n-valeraldehyde and subsequent hydrogenation of the resultant 2-propylheptanal, for example in accordance with U.S. Pat. No. 2,921,089. By virtue of the production process, commercially obtainable 2-propylheptanol generally comprises, alongside the main component 2-propylheptanol, one or more of the following isomers of 2-propylheptanol: 2-propyl-4-methylhexanol, 2-propyl-5-methylhexanol, 2-isopropylheptanol, 2-isopropyl-4-methylhexanol, 2-isopropyl-5-methylhexanol, and/or 2-propyl-4,4-dimethylpentanol. The presence of other isomers of 2-propylheptanol, for example 2-ethyl-2,4-dimethylhexanol, 2-ethyl-2-methylheptanol, and/or 2-ethyl-2,5-dimethylhexanol, in the 2-propylheptanol is possible, but because the rates of formation of the aldehydic precursors of these isomers in the aldol condensation are low, the amounts of these present in the 2-propylheptanol are only trace amounts, if they are present at all, and they play practically no part in determining the plasticizer properties of the compounds produced from these 2-propylheptanol isomer mixtures.

Various hydrocarbon sources can be utilized as starting material for the production of 2-propylheptanol, for example 1-butene, 2-butene, raffinate I—an alkane/alkene mixture which is obtained from the 04 cut of a cracker after removal of allenes, of acetylenes, and of dienes and which also comprises, alongside 1- and 2-butene, considerable amounts of isobutene—or raffinate II, which is obtained from raffinate I via removal of isobutene and then comprises, as olefin components other than 1- and 2-butene, only small proportions of isobutene. It is also possible, of course, to use mixtures of raffinate I and raffinate II as raw material for the production of 2-propylheptanol. These olefins or olefin mixtures can be hydroformylated by methods that are conventional per se with cobalt or rhodium catalysts, and 1-butene here gives a mixture of n- and isovaleraldehyde—the term isovaleraldehyde designating the compound 2-methylbutanal, the n/iso ratio of which can vary within relatively wide limits, depending on catalyst used and on hydroformylation conditions. By way of example, when a triphenylphosphine-modified homogeneous rhodium catalyst (Rh/TPP) is used, n- and isovaleraldehyde are formed in an n/iso ratio that is generally from 10:1 to 20:1 from 1-butene, whereas when rhodium hydroformylation catalysts modified with phosphite ligands are used, for example in accordance with U.S. Pat. No. 5,288,918 or WO 05028407, or when rhodium hydroformylation catalysts modified with phosphoamidite ligands are used, for example in accordance with WO 0283695, n-valeraldehyde is formed almost exclusively. While the Rh/TPP catalyst system converts 2-butene only very slowly in the hydroformylation, and most of the 2-butene can therefore be reclaimed from the hydroformylation mixture, 2-butene is successfully hydroformylated with the phosphite-ligand- or phosphorus amidite ligand-modified rhodium catalysts mentioned, the main product formed being n-valeraldehyde. In contrast, isobutene comprised within the olefinic raw material is hydroformylated at varying rates by practically all catalyst systems to 3-methylbutanal and, in the case of some catalysts, to a lesser extent to pivalaldehyde.

The $C_5$ aldehydes obtained in accordance with starting materials and catalysts used, i.e., n-valeraldehyde optionally mixed with isovaleraldehyde, 3-methylbutanal, and/or pivalaldehyde, can be separated, if desired, completely or to some extent by distillation into the individual components prior to the aldol condensation, and here again there is therefore a possibility of influencing and of controlling the composition of isomers of the $C_{10}$ alcohol component of the ester mixtures used in the process of the invention. Equally, it is possible that the $C_5$ aldehyde mixture formed during the hydroformylation is introduced into the aldol condensation without prior isolation of individual isomers. If n-valeraldehyde is used in the aldol condensation, which can be carried out by means of a basic catalyst, for example an aqueous solution of sodium hydroxide or of potassium hydroxide, for example by the processes described in EP-A 366089, U.S. Pat. No. 4,426,524, or 5,434,313, 2-propylheptanal is produced as sole condensate, whereas if a mixture of isomeric $C_5$ aldehydes is used the product comprises an isomer mixture of the products of the homoaldol condensation of identical aldehyde molecules and of the crossed aldol condensation of different valeraldehyde isomers. The aldol condensation can, of course, be controlled via targeted reaction of individual isomers in such a way that a single aldol condensation isomer is formed predominantly or entirely. The relevant aldol condensates can then be hydrogenated with conventional hydrogenation catalysts, for example those mentioned above for the hydrogenation of aldehydes, to give the corresponding alcohols or alcohol mixtures, usually after preceding, preferably distillative isolation from the reaction mixture and, if desired, distillative purification.

As mentioned above, the compounds of the general formulae (I) and (II) comprised in the plasticizer composition of the invention can have been esterified with pure 2-propylheptanol. However, production of said esters generally uses mixtures of 2-propylheptanol with the propylheptanol isomers mentioned in which the content of 2-propylheptanol is at least 50% by weight, preferably from 60 to 98% by weight, and particularly preferably from 80 to 95% by weight, in particular from 85 to 95% by weight.

Suitable mixtures of 2-propylheptanol with the propylheptanol isomers comprise by way of example those of from 60 to 98% by weight of 2-propylheptanol, from 1 to 15% by weight of 2-propyl-4-methylhexanol, and from 0.01 to 20% by weight of 2-propyl-5-methylhexanol, and from 0.01 to 24% by weight of 2-isopropylheptanol, where the sum of the proportions of the individual constituents does not exceed 100% by weight. It is preferable that the proportions of the individual constituents give a total of 100% by weight.

Other suitable mixtures of 2-propylheptanol with the propylheptanol isomers comprise by way of example those of from 75 to 95% by weight of 2-propylheptanol, from 2 to 15% by weight of 2-propyl-4-methylhexanol, from 1 to 20% by weight of 2-propyl-5-methylhexanol, from 0.1 to 4% by weight of 2-isopropylheptanol, from 0.1 to 2% by weight of 2-isopropyl-4-methylhexanol, and from 0.1 to 2% by weight of 2-isopropyl-5-methylhexanol, where the sum of the proportions of the individual constituents does not exceed 100% by weight. It is preferable that the proportions of the individual constituents give a total of 100% by weight.

Preferred mixtures of 2-propylheptanol with the propylheptanol isomers comprise those with from 85 to 95% by weight of 2-propylheptanol, from 5 to 12% by weight of 2-propyl-4-methylhexanol, and from 0.1 to 2% by weight of 2-propyl-5-methylhexanol, and from 0.01 to 1% by weight of 2-isopropylheptanol, where the sum of the proportions of the individual constituents does not exceed 100% by weight. It is preferable that the proportions of the individual constituents give a total of 100% by weight.

When the 2-propylheptanol isomer mixtures mentioned are used instead of pure 2-propylheptanol for the production of the compounds of the general formulae (I) and (II), the isomer composition of the alkyl ester groups and, respectively, alkyl ether groups corresponds in practical terms to the composition of the propylheptanol isomer mixtures used for the esterification.

Undecanol

The undecanols, which are used for the production of the compounds of the general formulae (I) and (II) comprised in the plasticizer composition of the invention, can be straight-chain or branched, or can be composed of mixtures of straight-chain and branched undecanols. It is preferable to use, as alcohol component, mixtures of branched undecanols, also termed isoundecanol.

Substantially straight-chain undecanol can be obtained via rhodium- or preferably cobalt-catalyzed hydroformylation of 1-decene and subsequent hydrogenation of the resultant n-undecanal. The starting olefin 1-decene is produced by way of the SHOP process mentioned previously for the production of 1-octene.

For the production of branched isoundecanol, the 1-decene obtained in the SHOP process can be subjected to skeletal isomerization, for example by means of acidic zeolitic molecular sieves, as described in WO 9823566, in which case mixtures of isomeric decenes are formed, rhodium- or preferably cobalt-catalyzed hydroformylation of which, with subsequent hydrogenation of the resultant isoundecanal mixtures, gives the isoundecanol used in the production of the compounds (II) employed in accordance with the invention. Hydroformylation of 1-decene or of isodecene mixtures by means of rhodium or cobalt catalysis can be achieved as described previously in connection with the synthesis of $C_7$-$C_{10}$ alcohols. Similar considerations apply to the hydrogenation of n-undecanal or of isoundecanal mixtures to give n-undecanol and, respectively, isoundecanol.

After distillative purification of the hydrogenation product, the resultant $C_7$-$C_{11}$ alkyl alcohols or a mixture of these can be used as described above for the production of the compounds (I) or diester compounds of the general formula (II) used in the invention.

Dodecanol

Substantially straight-chain dodecanol can be obtained advantageously by way of the Alfol® process or Epal® process. These processes include the oxidation and hydrolysis of straight-chain trialkylaluminum compounds which are constructed stepwise by way of a plurality of ethylation reactions, starting from triethylaluminum, with use of Ziegler-Natta catalysts. The desired n-dodecanol can be obtained from the resultant mixtures of substantially straight-chain alkyl alcohols of varying chain length after distillative discharge of the $C_{12}$ alkyl alcohol fraction.

Alternatively, n-dodecanol can also be produced via hydrogenation of natural fatty acid methyl esters, for example from coconut oil.

Branched isododecanol can be obtained by analogy with the known processes for the codimerization and/or oligomerization of olefins as described, for example, in WO 0063151, with subsequent hydroformylation and hydrogenation of the isoundecene mixtures as described, for example, in DE-A 4339713. After distillative purification of the hydrogenation product, the resultant isododecanols or mixtures of these can be used as described above for the production of the compounds (I) or diester compounds of the general formula (II) used in the invention.

Molding Composition Applications

The molding composition of the invention is preferably used for the production of moldings and foils. Among these are in particular housings of electrical devices, for example of kitchen appliances, and computer housings; tooling; equipment; piping; cables; hoses, for example plastics hoses, water hoses and irrigation hoses, industrial rubber hoses, or chemicals hoses; wire sheathing; window profiles; vehicle-construction components, for example bodywork constituents, vibration dampers for engines; tires; furniture, for example chairs, tables, or shelving; cushion foam and mattress foam; tarpaulins, for example truck tarpaulins, tenting or roof tarpaulins; gaskets; composite foils, such as foils for laminated safety glass, in particular for vehicle windows and/or window panes; recording disks; synthetic leather; packaging containers; adhesive-tape foils, or coatings.

The molding composition of the invention is also suitable for the production of moldings and foils which come directly into contact with humans or with foods. These are primarily medical products, hygiene products, packaging for food or drink, products for the interior sector, toys and child-care items, sports-and-leisure products, apparel, or fibers for textiles, and the like.

The medical products which can be produced from the molding composition of the invention are by way of example tubes for enteral nutrition and hemodialysis, breathing tubes, infusion tubes, infusion bags, blood bags, catheters, tracheal tubes, disposable syringes, gloves, or breathing masks.

The packaging that can be produced from the molding composition of the invention for food or drink is by way of example freshness-retention foils, food-or-drink hoses, drinking-water hoses, containers for storing or freezing food or drink, lid gaskets, closure caps, crown corks, or synthetic corks for wine.

The products which can be produced from the molding composition of the invention for the interior sector are by way of example ground-coverings, which can be of homogeneous structure or can be composed of a plurality of layers, for example of at least one foamed layer, examples being floorcoverings, sports floors, or luxury vinyl tiles (LVTs), synthetic leathers, wallcoverings, or foamed or unfoamed wallpapers, in buildings, or can be cladding or console covers in vehicles.

The toys and child-care items which can be produced from the molding composition of the invention are by way of example dolls, inflatable toys, such as balls, toy figures, toy animals, anatomic models for training, modeling clays, swimming aids, stroller covers, baby-changing mats, bedwarmers, teething rings, or bottles.

The sports-and-leisure products that can be produced from the molding composition of the invention are by way of example gymnastics balls or other balls, exercise mats, seat cushions, massage balls and massage rollers, shoes and shoe soles, air mattresses, or drinking bottles.

The apparel that can be produced from the molding compositions of the invention is by way of example (coated) textiles, such as latex clothing, protective apparel or rain apparel, for instance rain jackets, or rubber boots.

Non-PVC Applications

The present invention also includes the use of the plasticizer composition of the invention as and/or in auxiliaries selected from: calendering auxiliaries; rheology auxiliaries; surfactant compositions, such as flow aids and film-forming aids, defoamers, antifoams, wetting agents, coalescing agents, and emulsifiers; lubricants, such as lubricating oils, lubricating greases, and lubricating pastes; quenchers for chemical reactions; phlegmatizing agents; pharmaceutical products; plasticizers in adhesives or sealants; impact modifiers, and standardizing additives.

The examples and the figures described below provide further explanation of the invention. These examples and figures are not to be understood as restricting the invention.

The examples and figures hereinafter use the following abbreviations:
638 stands for Palamoll® 638,
DOTP stands for di(2-ethylhexyl) terephthalate,
phr stands for parts by weight per 100 parts by weight of polymer.

DESCRIPTION OF FIGURES

The FIGURE shows the plasticizer compatibility of flexible PVC foils comprising 100 phr of the plasticizer composition used according to the invention, and also, for comparison, flexible PVC foils comprising exclusively the commercially available plasticizer DOTP (Palatinol® DOTP) or 638 (Palamoll® 638). The variable shown is the loss of dry weight [percent] as a function of the test duration (storage time) [days].

EXAMPLES

Ingredients used in the examples are as follows:

| Ingredient | Manufacturer |
| --- | --- |
| Suspension-PVC, Trade name Solvin ® 271 SP | SolVin SA, Brussels, Belgium |
| Polyester plasticizer based on adipic acid, 1,2-propanediol, and n-octanol, Trade name Palamoll ® 638 (abbreviation: 638) | BASF SE, Ludwigshafen, Germany |
| Di(2-ethylhexyl) terephthalate, Trade name Palatinol ® DOTP (abbreviation: DOTP) | BASF Corporation, Florham Park, USA |
| Ba—Zn stabilizer, Trade name Reagens ® SLX/781 | Reagens S.p.A., Bologna, Italy |

I) Production and Testing of Flexible PVC Films Produced Using Inventive Plasticizer Compositions and Using Commercially Available Plasticizers:
Formulations:

| Ingredient | Proportion [phr] |
| --- | --- |
| PVC (homopolymeric suspension-PVC, Trade name Solvin ® 271 SP) | 100 |

-continued

| Ingredient | Proportion [phr] |
| --- | --- |
| Inventive plasticizer composition | 100 |
| Ba—Zn stabilizer, Trade name Reagens ® SLX/781 | 2 |

Plasticizer Compositions Used:

| | Plasticizer composition | |
| --- | --- | --- |
| Example | Palamoll ® 638 Amount [%] | Palatinol ® DOTP Amount [%] |
| 1 | 80 | 20 |
| 2 | 60 | 40 |
| 3 | 50 | 50 |
| C1 | 100 | 0 |
| C2 | 0 | 100 |

I.a) Production of the Flexible PVC Foils 150 g of PVC (homopolymeric suspension-PVC, Trade name Solvin® 271 SP), 150 g of plasticizer composition, and 2 g of Ba/Zn stabilizer, Trade name Reagens® SLX/781, were mixed at room temperature using a manual mixer. The mixture was subsequently plastified on an oil-heated laboratory mixing roller bed (Collin, automatic rolling mill type 150, diameter 252 mm, width: 450 mm) and processed to a milled sheet. The temperature of the two rolls was 180° C. in each case; the rotary speeds were 15 revolutions/min (front roll) and 12 revolutions/min (rear roll); the rolling time was 5 minutes. This gave a milled sheet with a thickness of 0.53 mm. After cooling, the milled sheet was pressed at a temperature of 190° C. under a pressure of 150 bar over 180 seconds in a press of type "laboratory panel press 400 P (002)" from Collin to give a flexible PVC foil with a thickness of 0.50 mm.

I.b) Testing of the Compatibility of the Plasticizers in the Flexible PVC Foils

Purpose of Investigation:

The test is used to quantify the compatibility of plasticizers in flexible PVC formulations. It is carried out at elevated temperature (70° C.) and 100% relative atmospheric humidity. The data obtained are evaluated against the storage time.

Test Specimens:

The test is carried out using test specimens (foils) having a size of 75×110×0.5 mm. The foils are perforated on the broad side, inscribed (soldering iron), and weighed.

Test Equipment:

Heraeus drying cabinet at 70° C., analytical balance, Testotherm thermometer with sensor for interior measurement within the drying cabinet.

Procedure:

The temperature in the interior of the drying cabinet is set to the required 70° C. The prepared, weighed foils are suspended on a wire rack and inserted into a glass tank filled to about 5 cm with water (fully demineralized water). Care should be taken to ensure that the foils are not in contact with one another. The lower edges of the foils should not hang into the water. The glass tank is sealed with a polyethylene foil so as to be impervious to water vapor, so that the water vapor subsequently produced in the glass tank is unable to escape. The water level in the glass pond is monitored daily, and any water lost is replaced.

Storage Time:

After 7, 14 and 28 days, two foils are taken from the glass tank and conditioned in the air for one hour, in free suspension. The surfaces of the foils are then cleaned using methanol. The foils are subsequently dried, in free suspension, at 70° C. for 16 hours in a drying cabinet with forced convection. Following removal from the drying cabinet, the foils are conditioned for one hour in free suspension and then weighed. The data reported in each case is the arithmetic mean of the weight loss of the foils.

Results

The FIGURE shows the results of the compatibility tests on PVC foils produced using the inventive plasticizer compositions (examples 1 to 3) and also using the pure polymer or monomer plasticizers (comparative examples 1 and 2). The parameter shown is the loss of dry weight [percent] as a function of the test duration (storage time) [days].

As can be seen very clearly in the FIGURE, the pure polymer plasticizer Palamoll® 638 has very poor compatibility with PVC. The weight loss in the compatibility test after 28 days is almost 18%. For the same total plasticizer content of 100 phr, the addition of just 20 phr 20 phr of DOTP (Palatinol® DOTP) leads to a marked reduction in the weight loss of plasticizer, by almost three quarters to about 5%, and hence to a marked improvement in compatibility. Through further increase in the amount of DOTP (Palatinol® DOTP) added, for the same overall plasticizer content, the weight loss can be reduced practically to the low level of the pure plasticizer DOTP (Palatinol® DOTP) in the compatibility test.

II) Determination of the Dynamic Viscosity of the Polyester Plasticizers of the General Formula (I):

The dynamic viscosity of the polyester plasticizers of the general formula (I) that are present in the plasticizer compositions of the invention was determined according to DIN EN ISO 3219. For this purpose, a small sample of the polymer plasticizer was applied by means of a disposable pipette to the stator of the rotor-stator unit, consisting of a cone/plate measuring unit with a diameter of 25 mm (model CP25-1 from Anton Paar), of the viscometer (MCR101 rheometer from Anton Paar). The rotor was then moved to the measuring position and the dynamic viscosity was determined by means of a rotary measurement at 20° C. and 128 rpm.

What is claimed is:

1. A plasticizer composition comprising
a) at least one compound of the general formula (I),

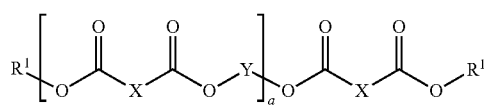

in which
X independently at each occurrence is an unbranched or branched $C_2$-$C_8$ alkylene group or an unbranched or branched $C_2$-$C_8$ alkenylene group, comprising at least one double bond,
Y is an unbranched or branched $C_2$-$C_{12}$ alkylene group or an unbranched or branched $C_2$-$C_{12}$ alkenylene group, comprising at least one double bond,
a is an integer from 2 to 50,
and
$R^1$ independently at each occurrence is selected from unbranched or branched $C_4$-$C_{12}$ alkyl radicals, where the groups X present in the compounds (I) can have the same or different definitions and
where the groups Y present in the compounds (I) are the same, and
b) at least one compound of the general formula (II),

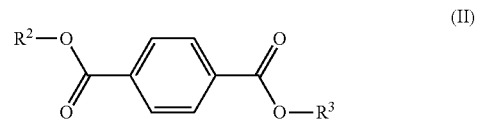

in which
$R^2$ and $R^3$ independently of one another are selected from branched and unbranched $C_4$-$C_{12}$ alkyl radicals.

2. The plasticizer composition according to claim 1, wherein the weight-average molar mass of the compounds (I) is in the range from 500 to 15 000.

3. The plasticizer composition according to claim 1, in the compounds of the general formula (I), X independently at each occurrence being a branched or unbranched $C_2$-$C_6$ alkylene group and Y being a branched or unbranched $C_2$-$C_5$ alkylene group.

4. The plasticizer composition according to claim 1, the groups X present in the compound (I) having the same definition and the groups Y present compounds (I) having the same definition.

5. The plasticizer composition according to claim 1, $R^1$ in the compounds of the general formula (I) independently at each occurrence being n-octyl, isooctyl, 2-ethylhexyl, n-nonyl, isononyl, 2-propylhexyl, n-decyl, isodecyl, or 2-propylheptyl.

6. The plasticizer composition according to claim 1, both radicals $R^1$ in the compounds of the general formula (I) being n-octyl, both being isononyl, or both being 2-propylheptyl.

7. The plasticizer composition according to claim 1, $R^2$ and $R^3$ in the compounds of the general formula (II) both being 2-ethylhexyl, both being isononyl or both being 2-propylheptyl.

8. The plasticizer composition according to claim 1, the plasticizer composition optionally comprising a further plasticizer which is different from the compounds (I) and (II) and which is selected from trimellitic trialkyl esters, benzoic alkyl esters, dibenzoic esters of glycols, hydroxybenzoic esters, esters of saturated monocarboxylic acids, esters of unsaturated monocarboxylic acids, amides and esters of aromatic sulfonic acids, alkylsulfonic esters, glycerol esters, isosorbide esters, phosphoric esters, citric triesters, alkylpyrrolidone derivatives, 2,5-furandicarboxylic esters, 2,5-tetrahydrofurandicarboxylic esters, epoxidized vegetable oils, epoxidized fatty acid monoalkyl esters, and polyesters of aliphatic and/or aromatic polycarboxylic acids with at least dihydric alcohols, other than compounds (I).

9. The plasticizer composition according to claim 1, the amount of compounds of the general formula (I) in the plasticizer composition being 10 to 99 wt %.

10. The plasticizer composition according to claim 1, the amount of compounds of the general formula (II) in the plasticizer composition being 1 to 90 wt %.

11. The plasticizer composition according to claim 1, wherein the weight ratio between compounds of the general formula (II) and compounds of the general formula (I) is in the range from 1:100 to 10:1.

12. A molding composition comprising at least one polymer and a plasticizer composition as defined in claim 1.

13. The molding composition according to claim 12, wherein the polymer is a thermoplastic polymer selected from
homopolymers or copolymers comprising in copolymerized form at least one monomer selected from $C_2$-$C_{10}$ monoolefins, 1,3-butadiene, 2-chloro-1,3-butadiene, vinyl alcohol and its $C_2$-$C_{10}$ alkyl esters, vinyl chloride, vinylidene chloride, vinylidene fluoride, tetrafluoroethylene, glycidyl acrylate, glycidyl methacrylate, acrylates and methacrylates of $C_1$-$C_{10}$ alcohols, vinylaromatics, (meth)acrylonitrile, maleic anhydride, and α,β-ethylenically unsaturated monocarboxylic and dicarboxylic acids,
homopolymers and copolymers of vinyl acetals,
polyvinyl esters,
polycarbonates,
polyesters,
polyethers,
polyetherketones,
thermoplastic polyurethanes,
polysulfides,
polysulfones,
polyethersulfones,
cellulose alkyl esters,
and mixtures thereof.

14. The molding composition according to claim 13, the thermoplastic polymer being selected from polyvinyl chloride (PVC), polyvinyl butyral (PVB), homopolymers and copolymers of vinyl acetate, homopolymers and copolymers of styrene, polyacrylates, thermoplastic polyurethanes (TPU), or polysulfides.

15. The molding composition according to claim 13, wherein the thermoplastic polymer is polyvinyl chloride (PVC).

16. The molding composition according to claim 15, the amount of the plasticizer composition in the molding composition being 1.0 to 300 phr.

17. The molding composition according to claim 13, comprising at least one thermoplastic polymer other than polyvinyl chloride, the amount of the plasticizer composition in the molding composition being 0.5 to 300 phr.

18. The molding composition according to claim 12, wherein the polymer is an elastomer.

19. The molding composition according to claim 18, the amount of the plasticizer composition in the molding composition being 1.0 to 60 phr.

20. A plasticizer for thermoplastic polymers and elastomers which comprises the plasticizer composition according to claim 1.

21. A molding which comprises utilizing the molding composition as defined in claim 12.

22. The molding according to claim 21, wherein the molding comes directly into contact with humans or with foods.

23. The process according to claim 22, wherein the molding which come directly into contact with humans or foods are medical products, hygiene products, packaging for food or drink, products for the interior sector, toys and child-care items, sports-and-leisure products, apparel and fibers for textiles.

24. The molding composition according to claim 12, wherein the polymer is a natural rubber, synthetic rubber or a mixture thereof.

25. A foil which comprises the molding composition as defined in claim 12.

26. The foil according to claim 25, wherein the foil comes directly into contact with humans or with foods.

27. The foil according to claim 26, wherein the foil which come directly into contact with humans or foods are medical products, hygiene products, packaging for food or drink, products for the interior sector, toys and child-care items, sports-and-leisure products, apparel and fibers for textiles.

* * * * *